Patented June 10, 1947

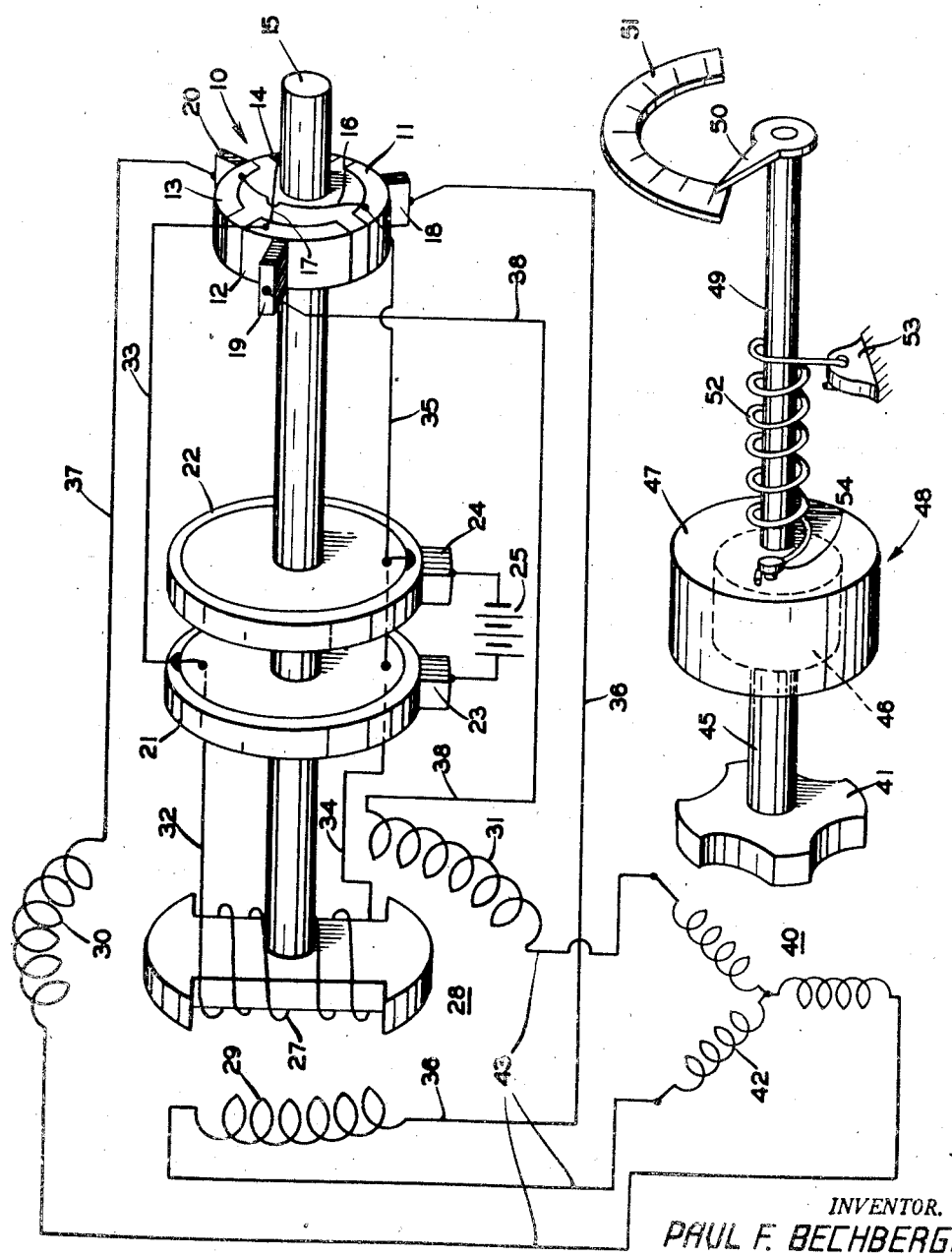

2,422,067

UNITED STATES PATENT OFFICE 2,422,067

REMOTE TACHOMETER DRIVE

Paul F. Hochberger, Tenafly, N. J., assignor to Bendix Aviation Corporation, Teterboro, N. J., a corporation of Delaware Application December 31, 1943, Serial No. 516,444

4 Claims. (Cl. 172—274)

The present invention relates to speed indicating systems and particularly to systems using synchronous motors or the like.

Many systems for indicating speed proportional to voltage and frequency have been developed, however, with the rapid advances in automotive and aircraft engine speeds, such prior systems have neglected to adequately provide means for accurately measuring low as well as high speeds.

Accordingly, with the present system a novel arrangement is devised for measuring very low speeds with the precision and accuracy of measuring high speed.

Another object is to provide in combination a variable speed synchronous motor and generator therefor adapted to actuate at high speeds, and a means associated therewith which is adapted to produce torque applying voltage at low speeds independent of the said high speed measuring arrangement.

Another object is to provide a novel electrical drive adapted to progressively actuate a tachometer or the like by a variable speed synchronous motor receiving power at frequencies and voltages in approximate phase relation and which are derived from an alternating current generator and a commutated source of alternating current, whereby a substantially constantly proportional voltage and torque for driving the synchronous motor and indicator at a speed proportional to the frequency supplied is accurately established.

Another object is to provide an improved electrical drive system, wherein an electrical means adapted to produce torque applying voltage at relatively low speeds is electrically connected, so as to be increased by means responsive to relative higher speeds for producing torque applying voltage to thereby drive a self-synchronous variable speed motor adapted to actuate a speed indicator member.

The above and other objects and advantages of the present invention will appear more fully hereinafter from a consideration of the detailed description which follows, taken together with the accompanying drawing wherein one embodiment of the invention is illustrated. It is to be expressly understood, however, that the drawing is for the purpose of illustration only and is not designed as a definition of the limits of the invention. Reference for this latter purpose should be had to the appended claims.

Referring now to the single figure of the drawing in which one of the various illustrative embodiments of my invention is shown, 10 designates a commutator having four conducting segments 11, 12, 13 and 14, fixed to a shaft 15 rotatable by an engine or other rotary device of which the speed is to be measured. Alternate segments 11 and 13 are interconnected by a wire 16, while the alternate segments 12 and 14 are likewise interconnected by a wire 17. Three brushes 18, 19 and 20 spaced 120° apart about the periphery of the commutator 10 are adapted to coact therewith.

Fixed to the shaft 15 in a suitable manner, are two slip rings 21 and 22. Cooperating with said slip rings are brushes 23 and 24 respectively, said brushes being connected to the opposite terminals of a battery 25.

Fixed to the outer end of the shaft 15 is a rotor winding 27 of a synchronous generator 28. The generator 28 is provided with the stator windings 29, 30 and 31. The end of the rotor winding 27 is connected by wire 32 to the slip ring 21 and thence by wire 33 to the wire 17 interconnecting the commutating segments 12 and 14. The other end of the rotor winding 27 is connected by wire 34 to the slip ring 22 and thence by wire 35 to the wire 16 interconnecting the commutator segments 11 and 13.

The field winding 29 is connected at one end by a wire 36 to the brush 19 of the commutator. The winding 30 is connected by a wire 37 to the brush 20, while the winding 31 is connected by a wire 37 to the brush 18. A synchronous motor 40 having a permanent magnet rotor 41 and a three phase Y-connected stator winding 42 is connected by leads 43 to the other ends of the stator windings of the generator 28. The permanent magnet rotor 41 is fixed to a shaft 45, the other end of said shaft having affixed thereto a second permanent magnet rotor 46. The rotor 46 is adapted to be rotated within a concentric cup 47 made of highly conductive, but non-magnetic material such as copper or aluminum. The rotor 46 and the cup 47 constitute a drag cup device 48, well-known in the art.

The cup 47 is integral with one end of a shaft 49, the other end of said shaft being provided with a pointer 50. The pointer 50 is adapted to be moved by said shaft over the face of a dial 51 to indicate the speed of rotation of the shaft 15. A coil spring 52 wound about the shaft 49 anchored at one end, as at 53, and at the other end to a stud 54 in the drag cup 47, offers the necessary resistance to the turning moment of the cup 47, and acts as a return spring to bring the pointer 50 back to its neutral or zero position.

When the generator winding 27 is rotated at very low speeds, the voltage developed by the generator is normally insufficient to drive the synchronous motor 40. In the instant case, the commutator 10 and the battery 25 are provided to insure a voltage of sufficient amplitude to drive the motor 40. Upon rotation of the shaft 15 by an engine, the direct current applied to the slip rings 21 and 22 will be inverted by the commutator 10 to an alternating current having an approximate square wave form. The rotational speed of the shaft 15 will determine the frequency of the battery current, the amplitude of which will remain constant.

Thus, at very low speeds, a voltage is applied to the stator windings 42 of sufficient amplitude to drive the rotor 41 for operating the drag cup 48. The frequency at which the motor 40 will operate is determined by the frequency of the shaft 15. The alternating current developed by the generator 28 when shaft 15 is rotated at a slow rate of speed, will be extremely small causing very little effect on the battery circuit. It is apparent that the frequency of the battery current as delivered by the commutator will be of the same frequency and phase as the alternating current developed by the generator 28. This is true since the commutator 10 and the rotor winding 27 of the generator are rotated by the shaft 15. The two voltages will, therefore, be added to each other in the leads 43 to increase the amplitude of the voltage supplied to the motor 40.

As the speed of the shaft 15 increases, the generator 28 will eventually develop a voltage of sufficient amplitude to operate the motor 40. As the speed of shaft 15 increases, the voltage developed by the generator increases proportionately, the frequency also increasing. The alternating battery voltage being added to that developed by the generator as the speed increases forms a part of the overall amplitude supplied to the synchronous motor 40. The motor 40 is thus operated at a speed which is at all times proportional to the speed of the shaft 15; at low rates of speed the motor being controlled by the alternating battery current as delivered by the commutator 10, and at higher rates of speed by the A. C. voltage of the generator 28 added to the alternating battery voltage.

There is thus provided a novel drive for electrical tachometers or the like, wherein a relatively accurate measurement of speed in response to frequency supplied is maintained from very low to very high speeds. Also, the present invention eliminates substantially all mechanical speed take-off connections, is simple to manufacture and easy to install.

While only one embodiment of the invention has been illustrated and described, other changes and modifications, which will now appear to those skilled in the art, may be made without departing from the scope of the present invention. Reference is, therefore, to be had to the appended claims for a definition of the limits of the present invention.

What is claimed is:

1. A remote drive means for a polyphase motor and an indicator element associated therewith, comprising a source of direct current, a plurality of contact members connected to said source, a field winding connected in parallel with said contact members, means adapted to rotate said contact members and said windings simultaneously, and a plurality of stator coils in series with each of said contact members, whereby rotation of said contact members at low speed provides voltage for producing a driving torque to said motor, independently of said winding, directly through said stator coils, and whereby said stator coils have torque producing voltage induced therein at high speeds to drive said motor, which merges with and increases the voltage produced by said contact members.

2. An electrical drive for a polyphase motor comprising a source of direct current, a commutator for converting current from said source to alternating current, a synchronous motor connected in series with said commutator for receiving alternating current therefrom, a generator having field windings rotatable simultaneously with said commutator and connected in series with said source and in parallel with the input side of said commutator, said generator having its generator windings connected in series with said commutator and said synchronous motor, whereby voltage for providing driving torque in said synchronous motor is maintained at relatively low speeds of said commutator, and higher voltage is developed in said generator for driving said synchronous motor, the voltage generated by said generator merging with and increasing the voltage delivered from said source through said commutator.

3. An electrical drive for a polyphase motor, comprising, a polyphase motor, a source of direct current, a generator having field windings supplied from said source, a commutator having segments connected in parallel to said field windings and connected to receive current from said source, commutator brushes connected in series with the stator windings of said generator and with said polyphase motor, and means adapted to rotate said commutator and said field windings simultaneously, said commutator supplying alternating current from said direct current source to said polyphase motor through said generator windings at sufficient voltage to operate said polyphase motor at low speeds of said rotating means the voltages generated by the rotation of the field windings at higher speeds providing increased voltages to operate said polyphase motor at higher speeds.

4. Means in combination with a rotatable shaft for measuring the rotational speed thereof, comprising a D. C. voltage source, a commutator connected across said D. C. source and rotatable by said shaft, an A. C. generator having a field winding connected across said D. C. source and rotatable by said shaft, and stator coils connected at one end to the output of said commutator; and a synchronous motor connected to the other ends of said stator coils, the A. C. output of said commutator operating said synchronous motor at low speeds of the shaft, the A. C. output of said commutator and of said generator operating said motor at higher speeds of said shaft; the operation of said synchronous motor being proportional to the rotational speed of said shaft.

PAUL F. BECHBERGER.

REFERENCES CITED

The following references are of record in the file of this patent:

UNITED STATES PATENTS

| Number | Name | Date |
| --- | --- | --- |
| 683,235 | Thury | Sept. 24, 1901 |
| 814,380 | Lamme | Mar. 6, 1906 |
| 1,068,111 | Crain | July 22, 1913 |
| 1,196,494 | Tiffany | Aug. 29, 1916 |
| 1,196,516 | Canton | Aug. 29, 1916 |